US009220057B2

(12) United States Patent
Sugimoto et al.

(10) Patent No.: US 9,220,057 B2
(45) Date of Patent: Dec. 22, 2015

(54) OPERATOR SELECTING APPARATUS AND METHOD FOR SELECTING A HOME OPERATOR FOR EACH COMMUNICATION DEVICE IN A GROUP

(75) Inventors: Shinta Sugimoto, Kanagawa (JP); Shingo Murakami, Kanagawa (JP); Toshikane Oda, Tokyo (JP)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 344 days.

(21) Appl. No.: 13/877,499

(22) PCT Filed: Oct. 22, 2010

(86) PCT No.: PCT/JP2010/069238
§ 371 (c)(1),
(2), (4) Date: Jun. 5, 2013

(87) PCT Pub. No.: WO2012/053119
PCT Pub. Date: Apr. 26, 2012

(65) Prior Publication Data
US 2013/0252579 A1 Sep. 26, 2013

(51) Int. Cl.
*H04M 11/00* (2006.01)
*H04W 48/18* (2009.01)
*H04M 15/00* (2006.01)

(52) U.S. Cl.
CPC .................... *H04W 48/18* (2013.01)

(58) Field of Classification Search
CPC .................................................. H04W 48/18
USPC ......................................................... 455/406
See application file for complete search history.

(56) References Cited

U.S. PATENT DOCUMENTS

2004/0198356 A1* 10/2004 Dunlop et al. ............. 455/435.2
2007/0111734 A1   5/2007 Beppu et al.
2011/0250865 A1* 10/2011 Breitzman et al. ............ 455/406

FOREIGN PATENT DOCUMENTS

JP      2002-297755 A1   10/2002
WO   WO 03/049468 A1    6/2003

OTHER PUBLICATIONS

International Search Report, PCT/JP2010/069238, Dec. 14, 2010.
International Preliminary Report on Patentability, PCT/JP2010/069238, Aug. 31, 2012.

* cited by examiner

*Primary Examiner* — Muthuswamy Manoharan
(74) *Attorney, Agent, or Firm* — Patents on Demand, P.A.; Brian K. Buchheit; Scott M. Garrett

(57) ABSTRACT

An operator selecting apparatus and a method for selecting a home operator for each communication device in a group. A first selecting unit of the operator selecting apparatus selects, for each quality-oriented communication device in the group, a candidate operator out of a plurality of the candidate operators that is determined based on the quality information to provide the best quality of service to the communication device. The second selecting unit of the operator selecting apparatus then selects, for each cost-oriented communication device in the group, based on the billing system and a number of quality-oriented communication devices assigned to the each candidate operator as a result of the selection by the first selecting unit, a candidate operator out of the plurality of the candidate operators such that a total cost for all the communication devices in the group becomes lowest.

18 Claims, 6 Drawing Sheets

FIG. 4

OPERATOR SELECTING APPARATUS AND METHOD FOR SELECTING A HOME OPERATOR FOR EACH COMMUNICATION DEVICE IN A GROUP

CROSS REFERENCE TO RELATED APPLICATION

This application is a 35 U.S.C. §371 national stage application of PCT International Application No. PCT/JP2010/069238 filed on 22 Oct. 2010, the disclosure and content of which is incorporated by reference herein in its entirety. The above-referenced PCT International Application was published in the English language as International Publication No. WO 2012/053119 A1 on 26 Apr. 2012.

TECHNICAL FIELD

The present invention generally relates to an operator selecting apparatus and a method for selecting a home operator for each communication device in a group.

BACKGROUND

The 3rd Generation Partnership Project (3GPP) discusses remote provisioning of subscription for Machine-to-Machine equipment (M2ME) (see 3GPP TR 33.812 V9.0.0). According to TR 33.812, M2ME, which is a kind of a communication device, is provided with a temporary private identity called a Provisional Connectivity ID (PCID). The PCID follows the same format as an International Mobile Subscriber Identity (IMSI), and a network operator identified by the PCID is called a Registration Operator (RO). The M2ME accesses the RO using the PCID, and requests for subscription information called a Machine Communication Identity Module (MCIM). Upon receipt of such a request, the RO accesses another network operator called a Selected Home Operator (SHO), receives an MCIM issued by the SHO, and forwards the MCIM to the M2ME.

In this way, the M2ME is able to obtain the MCIM from the SHO via the RO using the PCID just one time, and thereafter, the M2ME is able to attach itself to a 3GPP network using the MCIM.

The mechanism of TR 33.812 is convenient for a user of a communication device such as a mobile phone in that it is possible for the user to obtain subscription information (i.e., an MCIM, which equates to a Universal Subscriber Identity Module (USIM) in this context) for the communication device via a network.

Meanwhile, a selection of a network operator as an SHO is important for a user of M2ME, because network operator billing systems and quality of service differ from one another. However, it is somewhat complicated and cumbersome for the user to identify the "best" network operator in terms of the balance between cost and quality. This is particularly the case when a single user owns and maintains a plurality of (typically, a large number of) M2MEs. One of the causes of such complexity is that some network operators offer a price discount to a subscriber if the subscriber makes subscription to the same network operator for a large number of communication devices such as M2ME. Accordingly, for a large number of communication devices, it will be quite complicated to achieve a good balance between the total cost and the overall quality while taking price discounts into account.

However, there is no mechanism in the art that facilitates the selection of a home operator (i.e., an SHO) for a large number of communication devices while taking both cost and quality into account.

SUMMARY

The present invention is intended to address the above-described problem, and it is a feature thereof to introduce a mechanism that facilitates the selection of a home operator for a large number of communication devices while taking both cost and quality into account.

According to the first aspect of the present invention, there is provided an operator selecting apparatus for selecting, for each communication device in a group, a home operator out of a plurality of candidate operators, wherein each candidate operator has a billing system regarding a service as a home operator and wherein the billing system of at least one of the candidate operators is configured to provide a discount in accordance with an increase of communication devices in the group for which the candidate operator is selected, the operator selecting apparatus comprising: a receiving unit that receives group information that defines the group and class information of the each communication device in the group, the class information specifying whether the communication device is a quality-oriented communication device that prioritizes quality of service over cost or a cost-oriented communication device that prioritizes cost over quality of service; a billing system obtaining unit that obtains information representing the billing system of the each candidate operator; a quality information obtaining unit that obtains quality information that specifies quality of service provided to the each communication device by the each candidate operator; a first selecting unit that selects, for each quality-oriented communication device in the group, a candidate operator out of the plurality of the candidate operators that is determined based on the quality information to provide the best quality of service to the communication device; and a second selecting unit that selects, for each cost-oriented communication device in the group, based on the billing system and a number of quality-oriented communication devices assigned to the each candidate operator as a result of the selection by the first selecting unit, a candidate operator out of the plurality of the candidate operators such that a total cost for all the communication devices in the group becomes lowest.

According to the second aspect of the present invention, there is provided a method, executed by an operator selecting apparatus, for selecting, for each communication device in a group, a home operator out of a plurality of candidate operators, wherein each candidate operator has a billing system regarding a service as a home operator and wherein the billing system of at least one of the candidate operators is configured to provide a discount in accordance with an increase of communication devices in the group for which the candidate operator is selected, the operator selecting apparatus comprising: a receiving step of receiving group information that defines the group and class information of the each communication device in the group, the class information specifying whether the communication device is a quality-oriented communication device that prioritizes quality of service over cost or a cost-oriented communication device that prioritizes cost over quality of service; a billing system obtaining step of obtaining information representing the billing system of the each candidate operator; a quality information obtaining step of obtaining quality information that specifies quality of service provided to the each communication device by the each candidate operator; a first selecting step of selecting, for each quality-oriented communication device in the group, a candidate operator out of the plurality of the candidate operators that is determined based on the quality information to provide the best quality of service to the communication device; and a second selecting step of selecting, for each cost-oriented communication device in the group, based on the billing system and a number of quality-oriented communication devices assigned to the each candidate operator as a result of the selection in the first selecting step, a candidate operator out of the plurality of the candidate operators such that a total cost for all the communication devices in the group becomes lowest.

Further features of the present invention will become apparent from the following description of exemplary embodiments with reference to the attached drawings, in which like reference characters designate the same or similar parts throughout the figures thereof.

DETAILED DESCRIPTION

In the following embodiments, the term M2ME refers to any kind of communication device that can access an operator's network using subscription information such as an MCIM. Accordingly, Connected Consumer Electronics (CCEs) are also included in the category of M2ME.

(System Overview)

Figure 1:
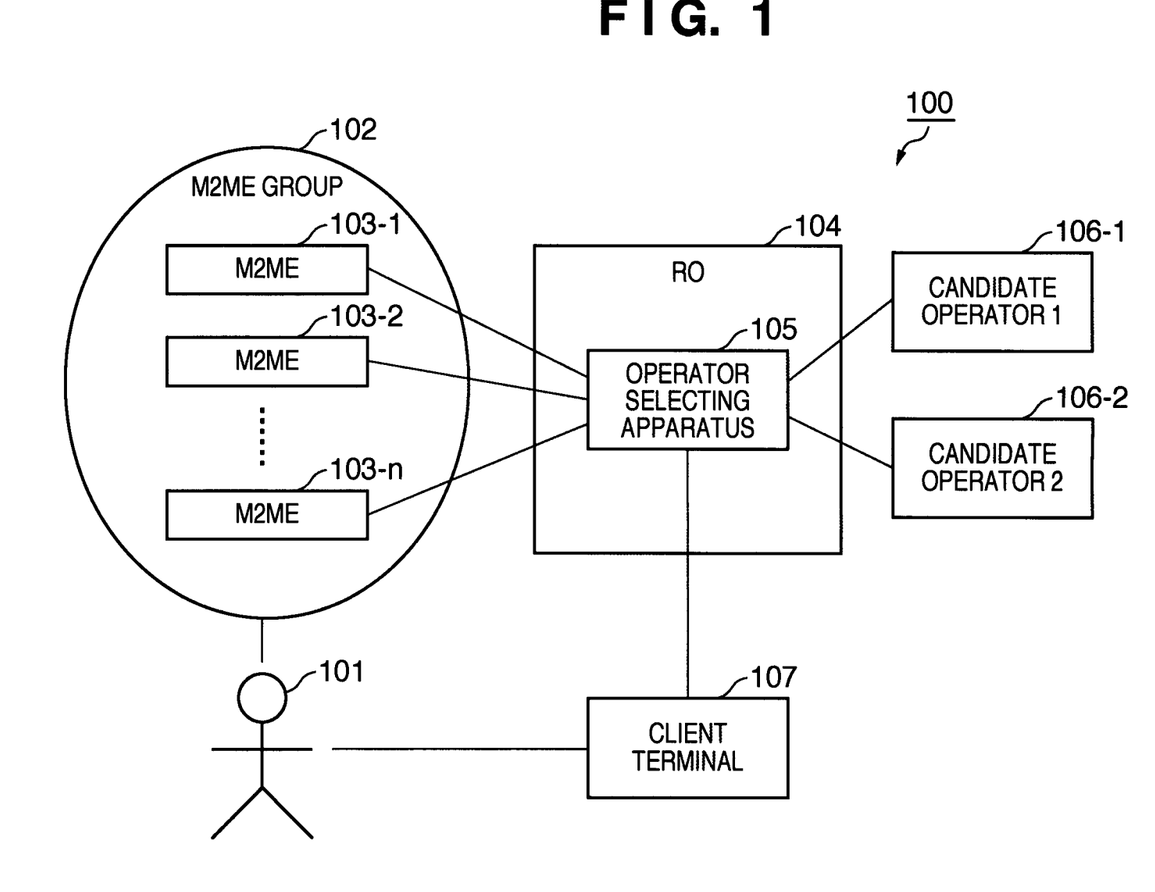
FIG. 1 illustrates an overview of a network system 100 according to an embodiment of the present invention.

FIG. 1 illustrates an overview of a network system 100 according to an embodiment of the present invention. In this system, a user 101 owns an M2ME group 102, which includes a plurality of M2MEs 103-1, 103-2, . . . , 103-n. In the following description, an "M2ME 103" refers to a given one of the M2MEs 103-1, 103-2, . . . , 103-n. The M2ME 103 obtains an MCIM from a network operator through the intervention of a Registration Operator (RO) 104. The RO 104 comprises an operator selecting apparatus 105, which selects a home operator (i.e., an SHO) for the M2ME 103. In this embodiment, for the sake of simplicity, it is assumed that there are two candidate operators (i.e., candidate operators 106-1 and 106-2) that can serve the M2ME 103 as an SHO. However, there may be three or more candidate operators. In the following description, a "candidate operator 106" refers to a given one of the candidate operators 106-1 and 106-2. The user 101 may provide the operator selecting apparatus 105 with the information regarding the M2ME group 102 via a client terminal 107.

The operator selecting apparatus 105 maintains an M2ME group profile, M2ME context information, and a network operator profile. Using these information items, the operator selecting apparatus 105 identifies the "best" candidate operator for each M2ME 103 taking the cost and quality of service into account. Details of these information items and the algorithm for identifying the best candidate operator will be described below.

(M2ME Group Profile)

The M2ME group profile includes group information that defines the M2ME group 102 and class information of each M2ME 103 in the M2ME group 102. The class information specifies whether the M2ME 103 is a quality-oriented M2ME that prioritizes quality of service over cost or a cost-oriented M2ME that prioritizes cost over quality of service. Accordingly, the M2ME group profile allows the operator selecting apparatus 105 to identify the M2MEs 103 forming the M2ME group 102 and to identify the preference of each M2ME 103 in the M2ME group 102.

Table 1 shows an example of the M2ME group profile. The M2ME identifier identifies each M2ME 103. For example, a PCID of the M2ME 103 can be used as the M2ME identifier. The M2ME group identifier identifies the M2ME group 102. Accordingly, the combination of the M2ME group identifier and the M2ME identifier corresponds to the group information that defines the M2ME group 102.

TABLE 1

Example of M2ME Group Profile

| M2ME Group Identifier | M2ME Identifier | M2ME Class | Requested QoS Indicator |
|---|---|---|---|
| 10050 | 429011234567890 | Quality | 7 |
| 10050 | 429011234567891 | Quality | 7 |
| 10050 | 429011234567892 | Cost | 9 |
| 10050 | 429011234567893 | Quality | 7 |
| 10050 | 429011234567894 | Quality | 7 |
| ... | ... | ... | ... |

The M2ME class corresponds to the class information, and specifies whether the M2ME 103 is quality-oriented or cost-oriented.

The M2ME group profile may optionally include a requested QoS indicator, which indicates a class of QoS requested for the M2ME 103. For Example, the QCI defined in 3GPP TS 23.203 can be used as a requested QoS indicator. In cases where the M2ME group profile includes the requested QoS indicator and the network operator profile includes a supported QoS indicator (described later), the operator selecting apparatus 105 can consider whether or not each candidate operator 106 supports the requested QoS when it selects a home operator for the M2ME 103.

The operator selecting apparatus 105 may obtain the M2ME group profile in various ways. For example, when the user 101 who owns a plurality of M2MEs 103 wishes to manage them as a group, the user 101 inputs, into the client terminal 107, information that should form the M2ME group profile. Then, the user 101 transmits the M2ME group profile from the client terminal 107 to the operator selecting apparatus 105 via a network.

(M2ME Context Information)

The M2ME context information includes signal strength information, which indicates signal strength of a radio signal received by each M2ME 103. The signal strength information indicates the signal strength for each candidate operator 106.

Table 2 shows an example of the M2ME context information. In the "Signal Strength" field, numerals in parentheses represent the signal strength. In this example, larger value represents a stronger signal, and "0" indicates "out of coverage". The M2ME context information may optionally include the currently selected operator for each M2ME 103.

TABLE 2

Example of M2ME Context Information

| M2ME Identifier | Signal Strength | Selected Operator |
|---|---|---|
| 429011234567890 | NO-1(80), NO-2(55) | NO-1 |
| 429011234567891 | NO-1(81), NO-2(60) | NO-1 |
| 429011234567892 | NO-1(83), NO-2(62) | NO-2 |
| 429011234567893 | NO-1(78), NO-2(61) | NO-1 |
| 429011234567894 | NO-1(79), NO-2(0) | NO-1 |
| ... | ... | ... |

The operator selecting apparatus 105 can use the signal strength information as quality information that specifies quality of service provided to each M2ME 103 by each candidate operator 106. Specifically, with the signal strength information, when the operator selecting apparatus 105 selects a home operator for each M2ME 103, it can consider which candidate operator provides the strongest radio signal to each M2ME 103.

It should be noted that the quality information is not limited to the signal strength information. For example, the supported QoS indicator, which may optionally be included in the network operator profile and is described later, may also be used as the quality information. In general, the quality information of the present embodiment may be the signal strength information, the supported QoS indicator, any information that can be an indicator of quality of service of each candidate operator 106, or any combination thereof. In cases where the signal strength information is not used as the quality information, it is not necessary for the operator selecting apparatus 105 to maintain the M2ME context information.

The operator selecting apparatus 105 may obtain the M2ME context information in various ways. For example, the operator selecting apparatus 105 periodically receives the signal strength information from each M2ME 103, and retains the latest signal strength information as the M2ME context information.

(Network Operator Profile)

The network operator profile includes operator identifiers of candidate operators and information representing billing systems of the candidate operators. The combination of Mobile Country Code (MCC) and Mobile Network Code (MNC) can be used as an operator identifier.

In the example of the present embodiment, as described above, there are two candidate operators 106-1 and 106-2 (in Table 3, they are represented by "NO-1" and "NO-2", respectively). However, there may be three or more candidate operators. The group of candidate operators may be defined in various ways. For example, the user 101 may decide the group and inform the operator selecting apparatus 105 of the group via the client terminal 107. Alternatively, the operator selecting apparatus 105 may statically have the information of the group in advance.

Table 3 shows an example of the network operator profile. In the present embodiment, it is assumed that at least one of the candidate operators has a billing system that is configured to provide a discount in accordance with an increase of M2MEs in a given group for which the candidate operator is selected as a home operator. In the example of Table 3, the numeral in parentheses represents the number of the subscribing M2MEs. Specifically, for the candidate operator NO-2, if the number of subscribing M2MEs is less than ten, each M2ME is charged 7 USD per month. However, if ten or more M2MEs subscribe to the candidate operator NO-2, a discount is made and each M2ME is charged 4.2 USD per month.

TABLE 3

Example of Network Operator Profile

| Operator Identifier | Billing System | Supported QoS Indicator |
|---|---|---|
| NO-1 | 5 USD | 1-7 |
| NO-2 | 7 USD, 4.2 USD(10) | 1-7 |

It should be noted that billing systems of candidate operators are usually more complicated, and the cost per month may not necessarily be constant, that is, the cost per month may vary depending upon, for example, the number of packets that have actually been transmitted/received by an M2ME. In addition, different candidate operators may have billing systems in different formats. In view of these circumstances, the operator selecting apparatus 105 may normalize the billing system of each candidate operator. In other words, as long as the "Billing System" field of the network operator profile contains an indicator that can be used to evaluate the cost of service as a home operator (i.e., SHO) by the candidate operator, the operator selecting apparatus 105 may process or normalize the billing system in any suitable manner.

The network operator profile may optionally include a supported QoS indicator, which indicates a class of QoS supported by the candidate operator. For example, the QCI defined in 3GPP TS 23.203 can be used as a supported QoS indicator. As described above, in cases where the M2ME group profile includes the requested QoS indicator and the network operator profile includes the supported QoS indicator, the operator selecting apparatus 105 can consider whether or not each candidate operator supports the requested QoS when it selects a home operator for the M2ME 103.

The operator selecting apparatus 105 may obtain the network operator profile in various ways. For example, the operator selecting apparatus 105 may receive the billing system (to be exact, information representing the billing system) and optionally the supported QoS indicator from each candidate operator during the setup of the operator selecting apparatus 105. In addition, when a given candidate operator updates the billing system, that candidate operator may send the updated billing system to the operator selecting apparatus 105. In some embodiments, a candidate operator may normalize the billing system and provide the operator selecting apparatus 105 with the normalized billing system.

(Configuration of Operator Selecting Apparatus 105)

Figure 2:
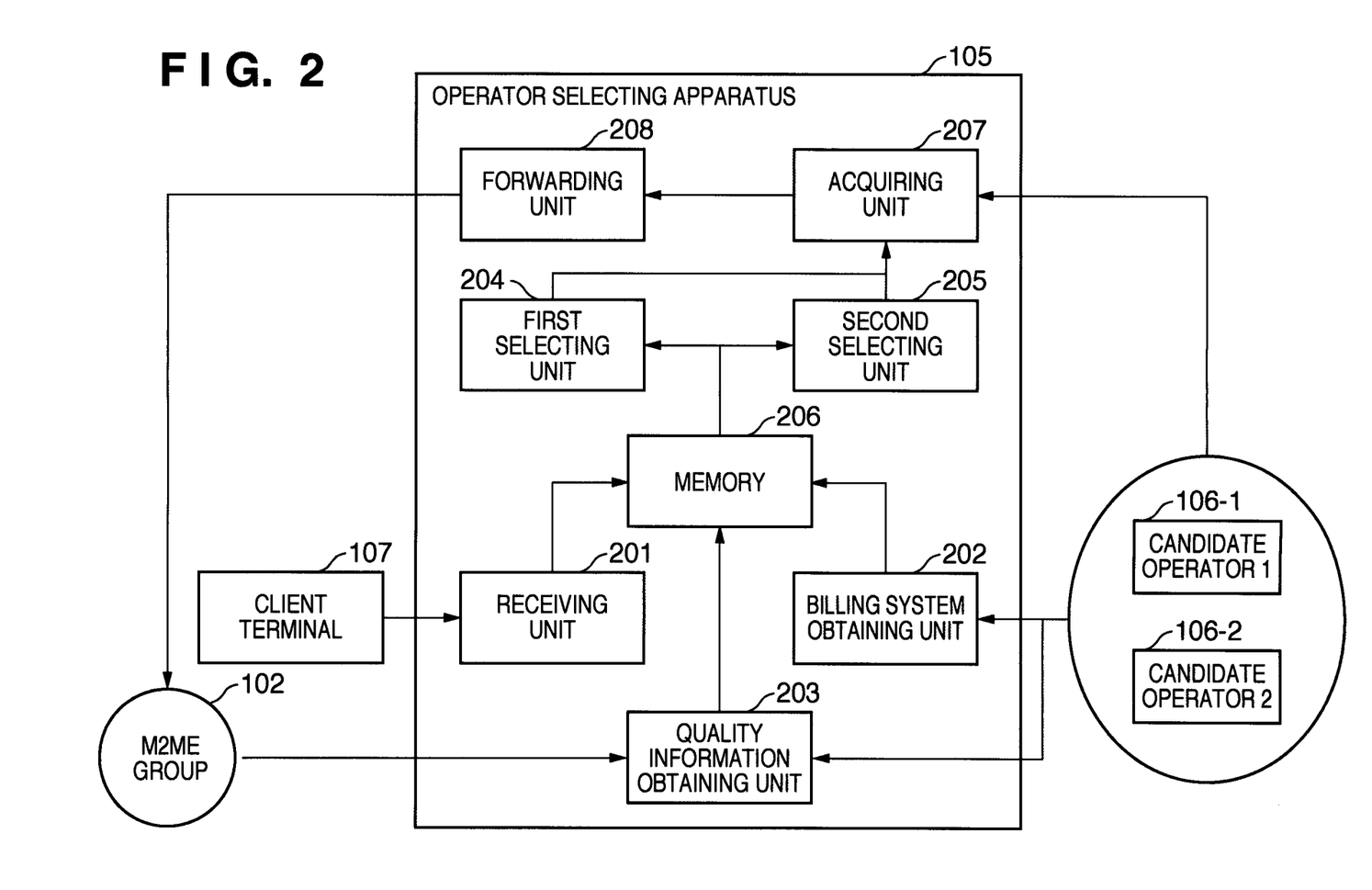
FIG. 2 illustrates a detailed configuration of the operator selecting apparatus 105.

FIG. 2 illustrates a detailed configuration of the operator selecting apparatus 105. The operator selecting apparatus 105 comprises a receiving unit 201, a billing system obtaining unit 202, a quality information obtaining unit 203, a first selecting unit 204, a second selecting unit 205, a memory 206, an acquiring unit 207, and a forwarding unit 208. In some embodiments, the acquiring unit 207 and the forwarding unit 208 may be located outside the operator selecting apparatus 105, and may be located somewhere in the RO 104. In cases where the operator selecting apparatus 105 comprises the acquiring unit 207 and the forwarding unit 208, the operator selecting apparatus 105 itself can execute functions as an RO. It should be noted that the functionality of each block in the operator selecting apparatus 105 may be implemented using dedicated hardware, using software executed by a processor (not shown), or a combination thereof. The detailed operations of each block in the operator selecting apparatus 105 will be described later with reference to the flowchart of FIG. 3.

(Operator Selecting Procedure)

Figure 3:
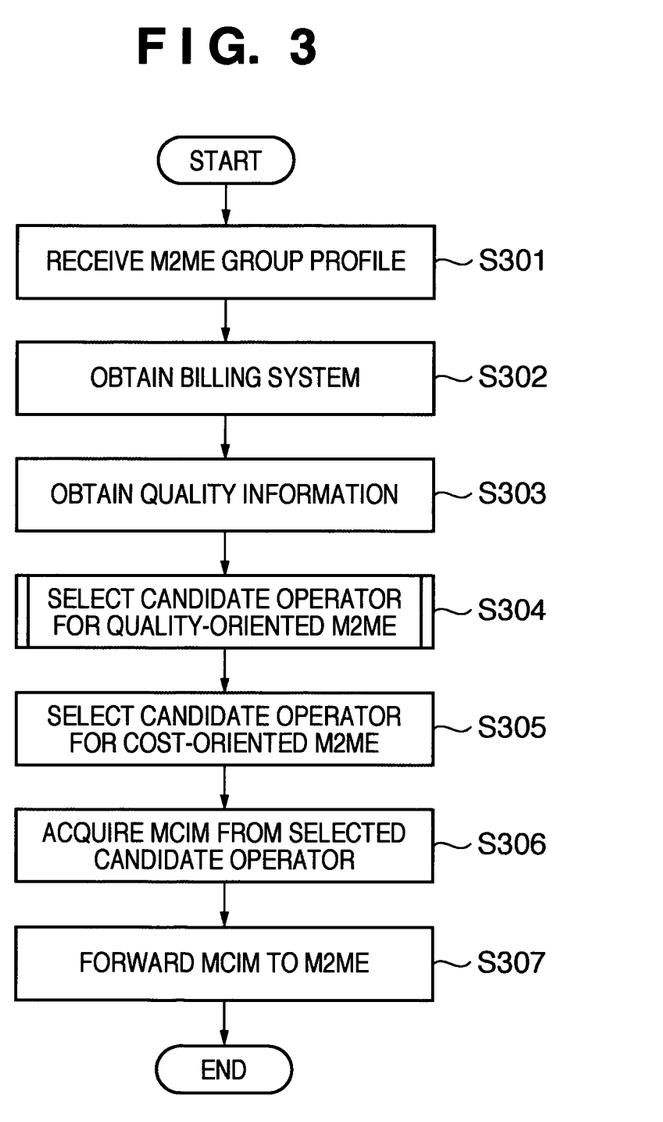
FIG. 3 is a flowchart illustrating a flow of the operator selecting procedure executed by the operator selecting apparatus 105 according to the embodiment of the present invention.

FIG. 3 is a flowchart illustrating a flow of the operator selecting procedure executed by the operator selecting apparatus 105 according to the embodiment of the present invention.

In step S301, the receiving unit 201 receives the M2ME group profile from the client terminal 107, and stores the received M2ME group profile in the memory 206 (see Table 1). In the present embodiment, it is assumed that the M2ME group information includes the group information and the class information for the M2ME group 102.

In step S302, the billing system obtaining unit 202 obtains the billing system of each candidate operator 106. As described above, the billing system may be normalized by the billing system obtaining unit 202 or each candidate operator 106. The billing system obtaining unit 202 stores the obtained billing system in the memory 206 to form the network operator profile (see Table 3).

In step S303, the quality information obtaining unit 203 obtains the quality information that specifies quality of service provided to each M2ME 103 by each candidate operator 106. As described above, the quality information may be the signal strength information, the supported QoS indicator, the combination thereof, or the like. Regarding the signal strength information, the quality information obtaining unit 203 obtains it from each M2ME 103 in the M2ME group 102, and stores the obtained signal strength information in the memory 206 as a part of the M2ME context information (see Table 2). Regarding the supported QoS indicator, the quality information obtaining unit 203 obtains it from each candidate operator 106, and stores the obtained supported QoS indicator in the memory 206 as a part of the network operator profile (see Table 3).

It should be noted that in cases where the supported QoS indicator is used as the quality information, the receiving unit 201 receives the requested QoS indicator of each M2ME 103 and stores it in the memory 206 as a part of the M2ME group profile (see Table 1).

In step S304, the first selecting unit 204 identifies the quality-oriented M2MEs in the M2ME group 102 based on the M2ME group profile in the memory 206. Then, the first selecting unit 204 selects, for each quality-oriented M2ME, a candidate operator out of the plurality of candidate operators 106 that provides the best quality of service to the M2ME. An example of the detailed process in step S304 will be described later with reference to FIG. 4.

In step S305, the second selecting unit 205 identifies the cost-oriented M2MEs in the M2ME group 102 based on the M2ME group profile in the memory 206. Then, the second selecting unit 205 selects, for each cost-oriented M2ME, a candidate operator out of the plurality of candidate operators 106 such that a total cost for all the M2MEs 103 in the M2ME group 102 becomes lowest. It should be noted that the second selecting unit 205 may perform the selection of this step under the condition that quality of service provided to each cost-oriented M2ME does not fall below a threshold (e.g., a candidate operator whose signal strength falls below "10" should not be selected). An example of the detailed process in step S305 will be described later.

In step S306, the acquiring unit 207 acquires, for each M2ME 103 in the M2ME group 102, an MCIM of the candidate operator selected in step S304 or S305 by the first selecting unit 204 or the second selecting unit 205.

In step S307, the forwarding unit 208 forwards, to each M2ME 103 in the M2ME group 102, the corresponding MCIM acquired in step S306 by the acquiring unit 207.

As a result of the operator selecting procedure described in FIG. 3, a candidate operator, which is "best" in terms of the balance between the total cost and the overall quality, is selected for each M2ME 103 as a home operator.

(Example of Detailed Processes in Step S304)

Figure 4:
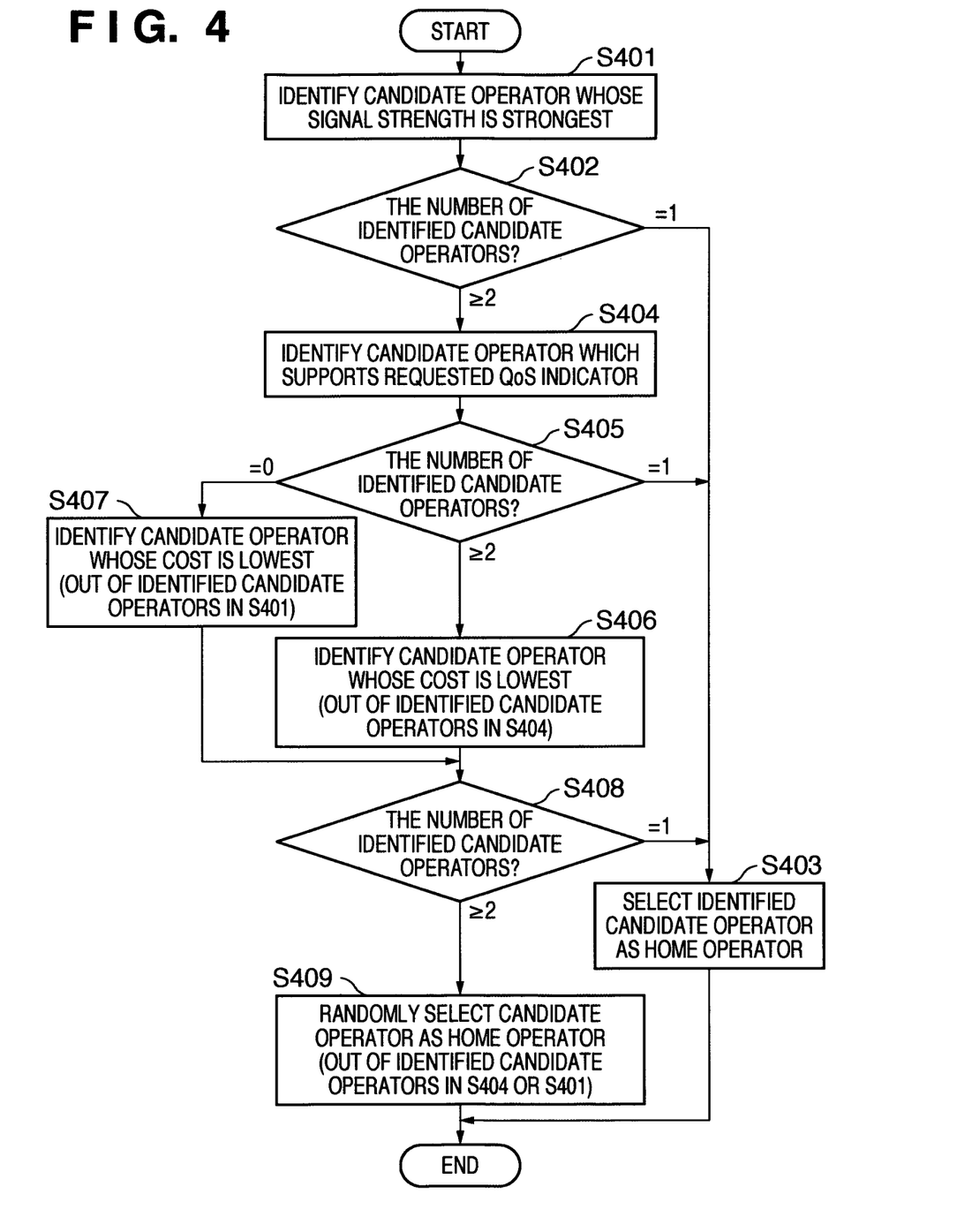
FIG. 4 is a flowchart illustrating a flow of an example of the detailed process in step S304 of FIG. 3.

FIG. 4 is a flowchart illustrating a flow of an example of the detailed process in step S304 of FIG. 3. In this example, it is assumed that the quality information includes both the signal strength information and the supported QoS indicator. The process of FIG. 4 is executed for each quality-oriented M2ME. The following description of FIG. 4 relates to a given one of the quality-oriented M2MEs.

In step S401, the first selecting unit 204 identifies, based on the signal strength information stored in the memory 206, a candidate operator, out of all the candidate operators 106, whose signal strength of the radio signal received by the quality-oriented M2ME is strongest.

In step S402, the first selecting unit 204 checks the number of candidate operators identified in step S401. If only one candidate operator is identified in step S401, the processing proceeds to step S403, and the first selecting unit 204 selects the identified candidate operator as a home operator for the quality-oriented M2ME. On the other hand, if two or more candidate operators are identified in step S401, the processing proceeds to step S404.

In step S404, the first selecting unit 204 identifies, based on the requested QoS indicator and the supported QoS indicator stored in the memory 206, a candidate operator, out of the candidate operators identified in step S401, which supports the class of quality of service requested for the quality-oriented M2ME.

In step S405, the first selecting unit 204 checks the number of candidate operators identified in step S404. If only one candidate operator is identified in step S404, the processing proceeds to step S403. On the other hand, if two or more candidate operators are identified in step S404, the processing proceeds to step S406, and the first selecting unit 204 identifies, based on the operator network profile stored in the memory 206, a candidate operator, out of the candidate operators identified in step S404, whose cost for the quality-oriented M2ME is lowest. Alternatively, if no candidate operator is identified in step S407 (i.e., in the case where no candidate operator supports the class of quality of service requested for the quality-oriented M2ME), the processing proceeds to step S407, and the first selecting unit 204 identifies, based on the operator network profile stored in the memory 206, a candidate operator, out of the candidate operators identified in step S401, whose cost for the quality-oriented M2ME is lowest.

In step S408, the first selecting unit 204 checks the number of candidate operators identified in step S406 or S407. If only one candidate operator is identified in step S406 or S407, the processing proceeds to step S403. On the other hand, if two or more candidate operators are identified in step S406 or S407, the processing proceeds to step S409, and the first selecting unit 204 randomly selects a candidate operator, out of the candidate operators identified in step S406 or S407, as a home operator for the quality-oriented M2ME.

(Example of Detailed Processes in Step S305)

The second selecting unit 205 can minimize the total cost for the M2ME group 102 in accordance with various algorithms. For example, it is assumed that the costs of the candidate operators 106-1 and 106-2 for one M2ME are specified by f(m) and g(n), respectively, where m/n is the number of M2MEs subscribing to the candidate operator 106-1/106-2. It is also assumed that the M2ME group 102 includes ten M2MEs, three of which are quality-oriented and seven of which are cost-oriented. As a result of the process in step S304 of FIG. 3, the candidate operator 106-1 is selected for one quality-oriented M2ME and the candidate operator 106-2 is selected for two quality-oriented M2MEs. In this case, the total cost y is derived from the following formula.

$$y=f(x)\cdot x+g(10-x)\cdot(10-x), \text{ where } 1 \leq x \leq 8$$

Accordingly, in order to minimize the total cost, the second selecting unit 205 executes the computation to identify x that minimizes y, and selects the candidate operator 106-1 for (x−1) cost-oriented M2MEs and selects the candidate operator 106-2 for (10−x) cost-oriented M2MEs.

(Re-Selection of Home Operator)

When the precondition related to the selection of a home operator changes, the operator selecting apparatus 105 may execute the re-selection of a home operator for each M2ME 103. For example, the re-selection may be executed in the following cases.

A new M2ME is added to the M2ME group 102, or some M2ME is removed from the M2ME group 102.

The class (quality-oriented or cost-oriented) of some M2ME is changed.

The quality information, such as the signal strength information, of some M2ME changes.

Billing system of some candidate operator is changed.

If the operator selecting apparatus 105 detects the change of the prediction, the operator selecting apparatus 105 updates the M2ME group profile, the M2ME context information, and the network operator profile stored in the memory 206 as needed, and executes the processes from step S304 in FIG. 3.

The operator selecting apparatus 105 detects the change of the prediction in various ways. For example, regarding the signal strength information, the quality information obtaining unit 203 periodically receives the signal strength information from each M2ME 103. Regarding the billing system, when a candidate operator updates their billing system, the candidate operator sends the updated billing system to the operator selecting apparatus 105, and the billing system obtaining unit 202 obtains the sent billing system.

Hereinafter, the cases wherein the signal strength information changes and wherein the class of some M2MEs is changed are described.

Figure 5:
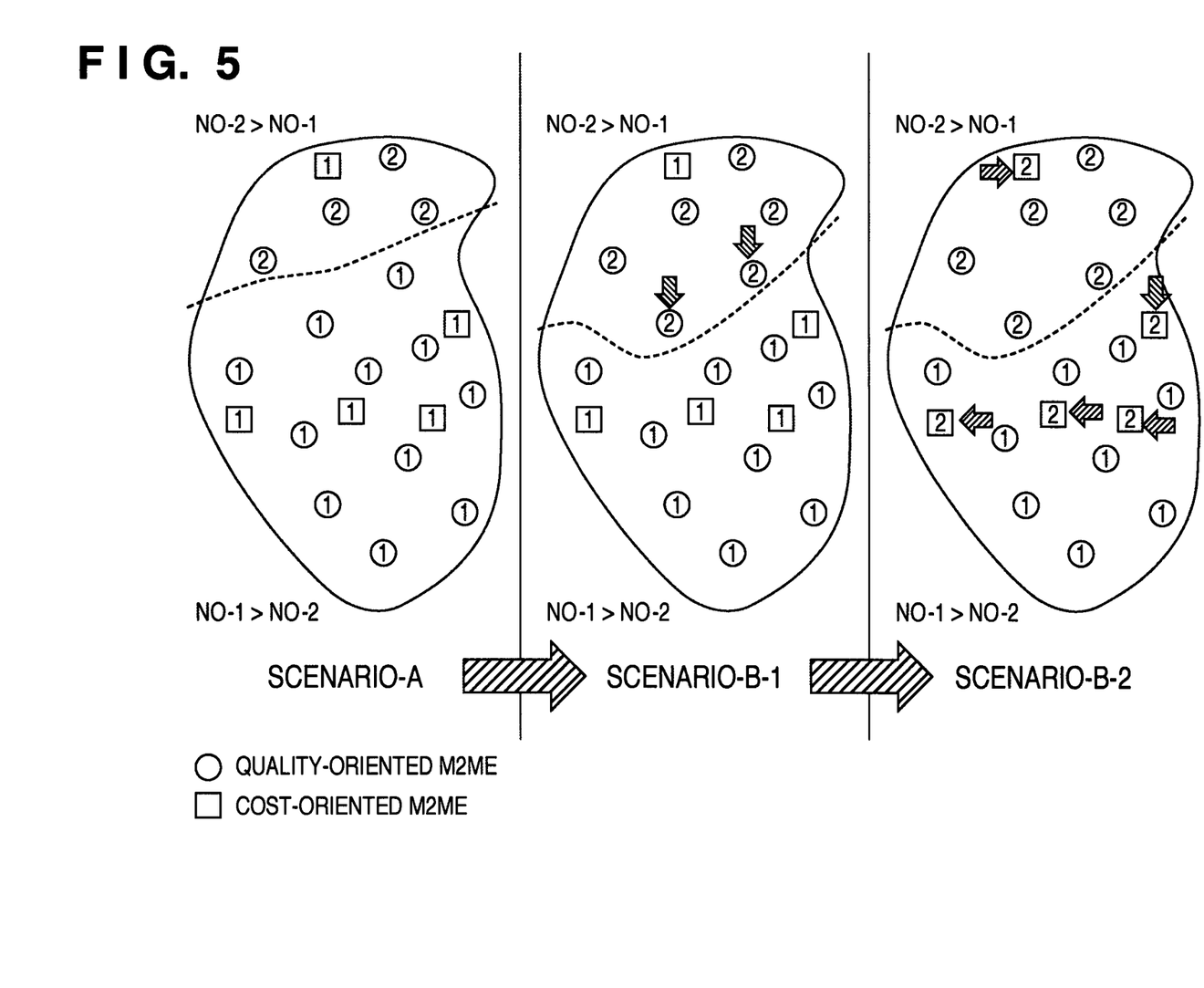
FIG. 5 is a diagram for illustrating the re-selection of a home operator executed when the signal strength information changes.

FIG. 5 is a diagram for illustrating the re-selection of a home operator executed when the signal strength information changes. In this example, the M2ME group 102 includes 15 quality-oriented M2MEs and 5 cost-oriented M2MEs. Quality-oriented M2MEs and cost-oriented M2MEs are depicted by a circle and a rectangle, respectively. The dotted line indicates a boundary of condition in terms of signal strength. In FIG. 4, the candidate operators 106-1 and 106-2 are depicted as "NO-1" and "NO-2", respectively, and their billing systems are those described in Table 3. The candidate operator 106-2 provides stronger signal strength than the candidate operator 106-1 in the area above the dotted line. Note that all the M2MEs 103 are within wireless coverage of both the candidate operators 106-1 and 106-2.

In the initial stage (see Scenario-A in FIG. 5), the selection of a home operator for each M2ME 103 is executed in accordance with the operator selecting procedure shown in FIG. 3. As a result, the candidate operator 106-1 is selected for sixteen M2MEs, and the candidate operator 106-2 is selected for four M2MEs.

Then, it is assumed that the condition of the signal strength within the geographical area changes due to, for example, deployment of Base Stations. In this example, the region in which the candidate operator 106-2 provides stronger signal strength than the candidate operator 106-1 becomes broader (i.e., the dotted line moves lower as shown in Scenario-B-1 of FIG. 5). In this case, the operator selecting apparatus 105 re-selects a home operator for the quality-oriented M2MEs in accordance with the process of step S304 in FIG. 3. As a result, as indicated in Scenario-B-1 in FIG. 5, a home operator for two M2MEs is changed from the candidate operator 106-1 to the candidate operator 106-2 because these two M2MEs can be provided stronger radio signal by the candidate operator 106-2 (the two M2MEs in question are pointed by arrows in FIG. 5). Next, the operator selecting apparatus 105 re-selects a home operator for the cost-oriented M2MEs in accordance with the process of step S305 in FIG. 3. As a result, as indicated in Scenario-B-2 in FIG. 5, a home operator for five M2MEs is changed from the candidate operator 106-1 to the candidate operator 106-2 in order to benefit from the discount provided by the candidate operator 106-2.

Figure 6:
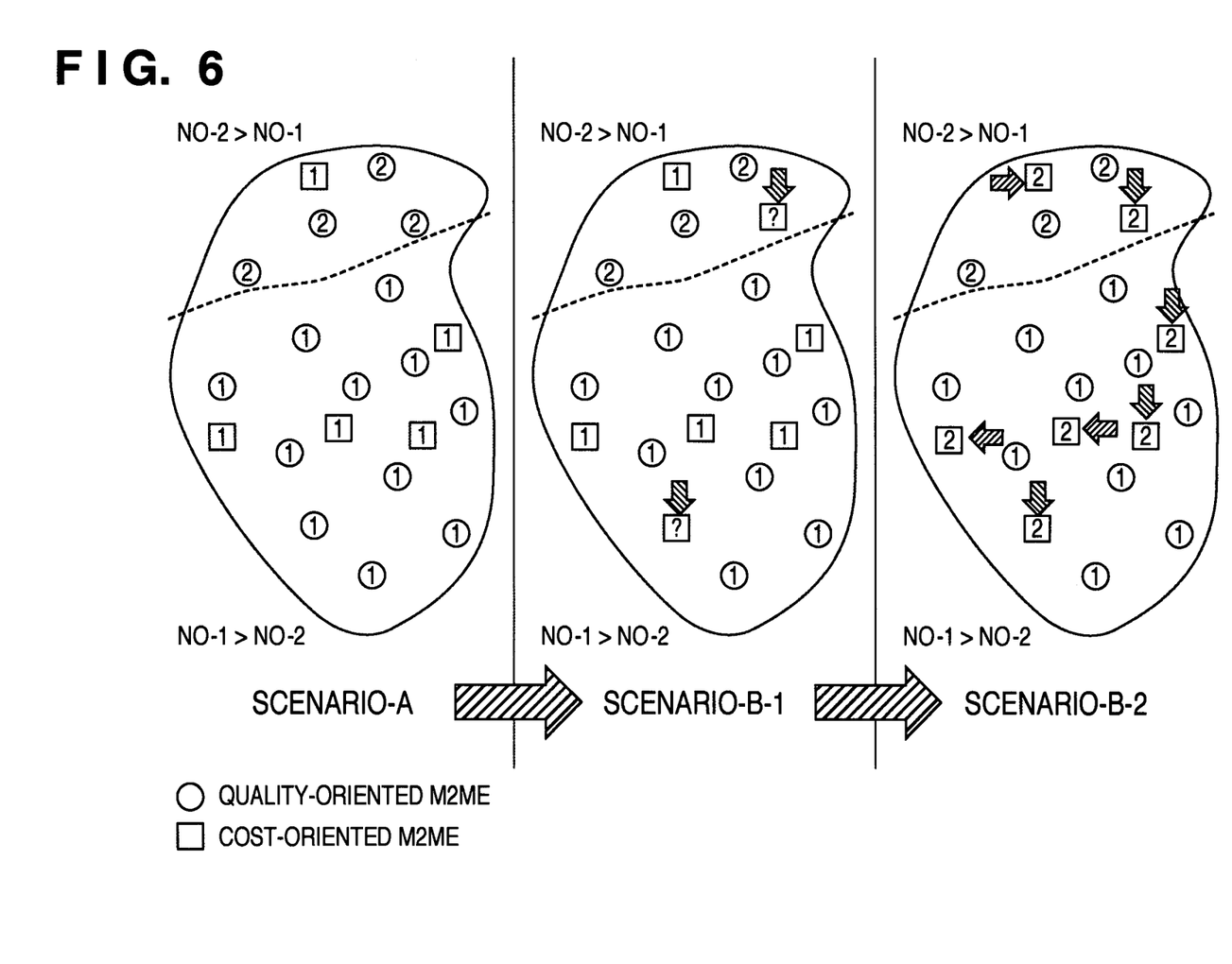
FIG. 6 is a diagram for illustrating the re-selection of the home operator executed when the class of some M2MEs is changed.

FIG. 6 is a diagram for illustrating the re-selection of a home operator executed when the class of some M2MEs is changed. In FIG. 6, the initial condition is the same as that of FIG. 5. In this example, it is assumed that the user 101 changes the M2ME class of two M2MEs from quality-oriented to cost-oriented via the client terminal 107, as indicated in Scenario-B-1 in FIG. 6. In this case, the operator selecting apparatus 105 executes the re-selection in a similar manner to that of the case shown in FIG. 5, although step S304 can be skipped in this case. As a result, the home operator is selected as shown in Scenario-B-2 in FIG. 6.

SUMMARY OF EMBODIMENT

As described above, the operator selecting apparatus 105 executes the operator selecting procedure (see FIG. 3) while taking the balance between the total cost and the overall quality into account. In this procedure, a price discount is also taken into account.

Accordingly, it is possible to facilitate the selection of a home operator for a large number of communication devices while taking both cost and quality into account.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An operator selecting apparatus for selecting, for each communication device in a group, a home operator out of a plurality of candidate operators, wherein each candidate operator has a billing system regarding a service as a home operator and wherein the billing system of at least one of the candidate operators is configured to provide a discount in accordance with an increase of communication devices in the group for which the candidate operator is selected, the operator selecting apparatus comprising:

a receiving unit that receives group information that defines the group and class information of said each communication device in the group, the class information specifying whether the communication device is a quality-oriented communication device that prioritizes quality of service over cost or a cost-oriented communication device that prioritizes cost over quality of service;

a billing system obtaining unit that obtains information representing the billing system of said each candidate operator;

a quality information obtaining unit that obtains quality information that specifies quality of service provided to said each communication device by said each candidate operator;

a first selecting unit that selects, for each quality-oriented communication device in the group, a candidate operator out of the plurality of the candidate operators that is determined based on the quality information to provide the best quality of service to the communication device; and a second selecting unit that selects, for each cost-oriented communication device in the group, based on the billing system and a number of quality-oriented communication devices assigned to said each candidate operator as a result of the selection by the first selecting unit, a candidate operator out of the plurality of the candidate operators such that a total cost for all the communication devices in the group becomes lowest, wherein:

the quality information obtaining unit obtains, as the quality information, signal strength information of said each candidate operator from said each communication device, the signal strength information indicating signal strength of a radio signal received by the communication device; and the first selecting unit determines, for said each quality-oriented communication device in the group, based on the signal strength information, that a candidate operator out of the plurality of the candidate operators, whose signal strength of a radio signal received by the communication device is strongest, provides the best quality of service to the communication device.

2. The operator selecting apparatus according to claim 1, wherein:

the first selecting unit responds to determining that two or more candidate operators provide the best quality of service, by selecting, based on the billing system, a candidate operator out of said two or more candidate operators whose cost for the communication device is lowest.

3. The operator selecting apparatus according to claim 1, wherein:

the second selecting unit performs the selection such that a total cost for all the communication devices in the group becomes lowest and while satisfying a condition that quality of service provided to said each cost-oriented communication device does not fall below a threshold.

4. The operator selecting apparatus according to claim 1, wherein:

in response to the quality information obtaining unit newly obtaining the quality information that differs from the previously obtained quality information, the first and second selecting units perform the selection again based on the newly obtained quality information.

5. The operator selecting apparatus according to claim 1, further comprising:

an acquiring unit that acquires, for said each communication device, subscription information that enables the communication device to be served by the candidate operator selected by the first or second selecting unit; and a forwarding unit that forwards, to said each communication device, the corresponding subscription information acquired by the acquiring unit.

6. An operator selecting apparatus for selecting, for each communication device in a group, a home operator out of a plurality of candidate operators, wherein each candidate operator has a billing system regarding a service as a home operator and wherein the billing system of at least one of the candidate operators is configured to provide a discount in accordance with an increase of communication devices in the group for which the candidate operator is selected, the operator selecting apparatus comprising:

a receiving unit that receives group information that defines the group and class information of said each communication device in the group, the class information specifying whether the communication device is a quality-oriented communication device that prioritizes quality of service over cost or a cost-oriented communication device that prioritizes cost over quality of service;

a billing system obtaining unit that obtains information representing the billing system of said each candidate operator;

a quality information obtaining unit that obtains quality information that specifies quality of service provided to said each communication device by said each candidate operator;

a first selecting unit that selects, for each quality-oriented communication device in the group, a candidate operator out of the plurality of the candidate operators that is determined based on the quality information to provide the best quality of service to the communication device; and a second selecting unit that selects, for each cost-oriented communication device in the group, based on the billing system and a number of quality-oriented communication devices assigned to said each candidate operator as a result of the selection by the first selecting unit, a candidate operator out of the plurality of the candidate operators such that a total cost for all the communication devices in the group becomes lowest, wherein:

the receiving unit further receives a requested quality of service indicator of said each communication device, the requested quality of service indicator indicating a class of quality of service requested for the communication device;

the quality information obtaining unit obtains, as the quality information, a supported quality of service indicator of said each candidate operator from said each candidate operator, the supported quality of service indicator indicating a class of quality of service supported by the candidate operator; and the first selecting unit determines, for said each quality-oriented communication device in the group, based on the requested quality of service indicator and the supported quality of service indicator, that a candidate operator out of the plurality of the candidate operators, which supports the class of quality of service requested for the communication device, provides the best quality of service to the communication device.

7. The operator selecting apparatus according to claim 6, wherein:

the first selecting unit responds to determining that two or more candidate operators provide the best quality of service, by selecting, based on the billing system, a candidate operator out of said two or more candidate operators whose cost for the communication device is lowest.

8. The operator selecting apparatus according to claim 6, wherein:
the second selecting unit performs the selection such that a total cost for all the communication devices in the group becomes lowest and while satisfying a condition that quality of service provided to said each cost-oriented communication device does not fall below a threshold.

9. The operator selecting apparatus according to claim 6, wherein:
in response to the quality information obtaining unit newly obtaining the quality information that differs from the previously obtained quality information, the first and second selecting units perform the selection again based on the newly obtained quality information.

10. The operator selecting apparatus according to claim 6, further comprising:
an acquiring unit that acquires, for said each communication device, subscription information that enables the communication device to be served by the candidate operator selected by the first or second selecting unit; and
a forwarding unit that forwards, to said each communication device, the corresponding subscription information acquired by the acquiring unit.

11. An operator selecting apparatus for selecting, for each communication device in a group, a home operator out of a plurality of candidate operators, wherein each candidate operator has a billing system regarding a service as a home operator and wherein the billing system of at least one of the candidate operators is configured to provide a discount in accordance with an increase of communication devices in the group for which the candidate operator is selected, the operator selecting apparatus comprising:
a receiving unit that receives group information that defines the group and class information of said each communication device in the group, the class information specifying whether the communication device is a quality-oriented communication device that prioritizes quality of service over cost or a cost-oriented communication device that prioritizes cost over quality of service;
a billing system obtaining unit that obtains information representing the billing system of said each candidate operator;
a quality information obtaining unit that obtains quality information that specifies quality of service provided to said each communication device by said each candidate operator;
a first selecting unit that selects, for each quality-oriented communication device in the group, a candidate operator out of the plurality of the candidate operators that is determined based on the quality information to provide the best quality of service to the communication device; and
a second selecting unit that selects, for each cost-oriented communication device in the group, based on the billing system and a number of quality-oriented communication devices assigned to said each candidate operator as a result of the selection by the first selecting unit, a candidate operator out of the plurality of the candidate operators such that a total cost for all the communication devices in the group becomes lowest,
wherein:
the receiving unit further receives a requested quality of service indicator of said each communication device, the requested quality of service indicator indicating a class of quality of service requested for the communication device;
the quality information obtaining unit obtains, as the quality information, signal strength information of said each candidate operator from said each communication device and a supported quality of service indicator of said each candidate operator from said each candidate operator, the signal strength information indicating signal strength of a radio signal received by the communication device and the supported quality of service indicator indicating a class of quality of service supported by the candidate operator; and
the first selecting unit detects, for said each quality-oriented communication device in the group, based on the signal strength information, one or more candidate operators out of the plurality of the candidate operators whose signal strength of a radio signal received by the communication device is strongest, and determines, based on the requested quality of service indicator and the supported quality of service indicator, that a candidate operator out of the detected one or more candidate operators, which supports the class of quality of service requested for the communication device, provides the best quality of service to the communication device.

12. A method, executed by an operator selecting apparatus, for selecting, for each communication device in a group, a home operator out of a plurality of candidate operators, wherein each candidate operator has a billing system regarding a service as a home operator and wherein the billing system of at least one of the candidate operators is configured to provide a discount in accordance with an increase of communication devices in the group for which the candidate operator is selected, the method comprising:
receiving group information that defines the group and class information of said each communication device in the group, the class information specifying whether the communication device is a quality-oriented communication device that prioritizes quality of service over cost or a cost-oriented communication device that prioritizes cost over quality of service;
obtaining information representing the billing system of said each candidate operator;
obtaining quality information that specifies quality of service provided to said each communication device by said each candidate operator;
first selecting, for each quality-oriented communication device in the group, a candidate operator out of the plurality of the candidate operators that is determined based on the quality information to provide the best quality of service to the communication device;
second selecting, for each cost-oriented communication device in the group, based on the billing system and a number of quality-oriented communication devices assigned to said each candidate operator as a result of the selection in the first selecting, a candidate operator out of the plurality of the candidate operators such that a total cost for all the communication devices in the group becomes lowest,
obtaining, as the quality information, signal strength information of said each candidate operator from said each communication device, the signal strength information indicating signal strength of a radio signal received by the communication device; and
determining, for said each quality-oriented communication device in the group, based on the signal strength information, that a candidate operator out of the plurality of the candidate operators, whose signal strength of a radio signal received by the communication device is strongest, provides the best quality of service to the communication device.

13. The method of claim 12, further comprising:
responding to determining that two or more candidate operators provide the best quality of service, by selecting, based on the billing system, a candidate operator out of said two or more candidate operators whose cost for the communication device is lowest.

14. The method of claim 12, further comprising:
performing the second selecting such that a total cost for all the communication devices in the group becomes lowest and while satisfying a condition that quality of service provided to said each cost-oriented communication device does not fall below a threshold.

15. The method of claim 12, further comprising:
in response to newly obtaining the quality information that differs from the previously obtained quality information, the perform the first and second selecting again based on the newly obtained quality information.

16. The method of claim 12, further comprising:
acquiring, for said each communication device, subscription information that enables the communication device to be served by the candidate operator selected by the first or second selecting unit; and
forwarding, to said each communication device, the corresponding subscription information.

17. A method, executed by an operator selecting apparatus, for selecting, for each communication device in a group, a home operator out of a plurality of candidate operators, wherein each candidate operator has a billing system regarding a service as a home operator and wherein the billing system of at least one of the candidate operators is configured to provide a discount in accordance with an increase of communication devices in the group for which the candidate operator is selected, the method comprising:
receiving group information that defines the group and class information of said each communication device in the group, the class information specifying whether the communication device is a quality-oriented communication device that prioritizes quality of service over cost or a cost-oriented communication device that prioritizes cost over quality of service;
obtaining information representing the billing system of said each candidate operator;
obtaining quality information that specifies quality of service provided to said each communication device by said each candidate operator;
first selecting, for each quality-oriented communication device in the group, a candidate operator out of the plurality of the candidate operators that is determined based on the quality information to provide the best quality of service to the communication device;
second selecting, for each cost-oriented communication device in the group, based on the billing system and a number of quality-oriented communication devices assigned to said each candidate operator as a result of the selection in the first selecting, a candidate operator out of the plurality of the candidate operators such that a total cost for all the communication devices in the group becomes lowest,
receiving a requested quality of service indicator of said each communication device, the requested quality of service indicator indicating a class of quality of service requested for the communication device;
obtaining, as the quality information, a supported quality of service indicator of said each candidate operator from said each candidate operator, the supported quality of service indicator indicating a class of quality of service supported by the candidate operator; and
determining, for said each quality-oriented communication device in the group, based on the requested quality of service indicator and the supported quality of service indicator, that a candidate operator out of the plurality of the candidate operators, which supports the class of quality of service requested for the communication device, provides the best quality of service to the communication device.

18. A method, executed by an operator selecting apparatus, for selecting, for each communication device in a group, a home operator out of a plurality of candidate operators, wherein each candidate operator has a billing system regarding a service as a home operator and wherein the billing system of at least one of the candidate operators is configured to provide a discount in accordance with an increase of communication devices in the group for which the candidate operator is selected, the method comprising:
receiving group information that defines the group and class information of said each communication device in the group, the class information specifying whether the communication device is a quality-oriented communication device that prioritizes quality of service over cost or a cost-oriented communication device that prioritizes cost over quality of service;
obtaining information representing the billing system of said each candidate operator;
obtaining quality information that specifies quality of service provided to said each communication device by said each candidate operator;
first selecting, for each quality-oriented communication device in the group, a candidate operator out of the plurality of the candidate operators that is determined based on the quality information to provide the best quality of service to the communication device;
second selecting, for each cost-oriented communication device in the group, based on the billing system and a number of quality-oriented communication devices assigned to said each candidate operator as a result of the selection in the first selecting, a candidate operator out of the plurality of the candidate operators such that a total cost for all the communication devices in the group becomes lowest,
receiving a requested quality of service indicator of said each communication device, the requested quality of service indicator indicating a class of quality of service requested for the communication device;
obtaining, as the quality information, signal strength information of said each candidate operator from said each communication device and a supported quality of service indicator of said each candidate operator from said each candidate operator, the signal strength information indicating signal strength of a radio signal received by the communication device and the supported quality of service indicator indicating a class of quality of service supported by the candidate operator; and
detecting, for said each quality-oriented communication device in the group, based on the signal strength information, one or more candidate operators out of the plurality of the candidate operators whose signal strength of a radio signal received by the communication device is strongest, and determines, based on the requested quality of service indicator and the supported quality of service indicator, that a candidate operator out of the detected one or more candidate operators, which supports the class of quality of service requested for the communication device, provides the best quality of service to the communication device.

* * * * *